No. 770,151. PATENTED SEPT. 13, 1904.
T. BAUER.
COKE OVEN.
APPLICATION FILED JAN. 3, 1900.
NO MODEL. 4 SHEETS—SHEET 1.
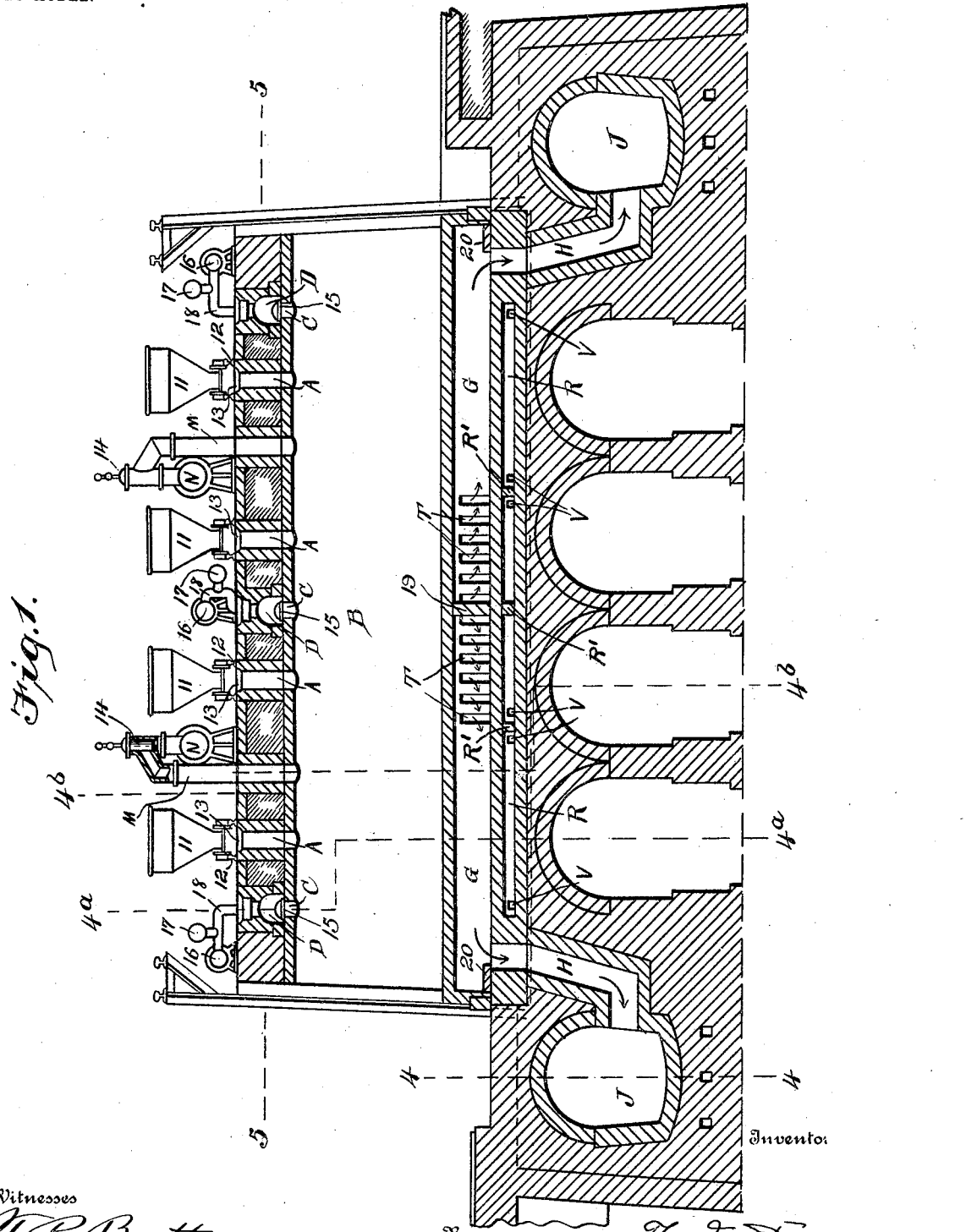
Witnesses
T. P. Bratt
Geo. Heinicke
Inventor
Theodor Bauer
By G. Dittmar
Attorney

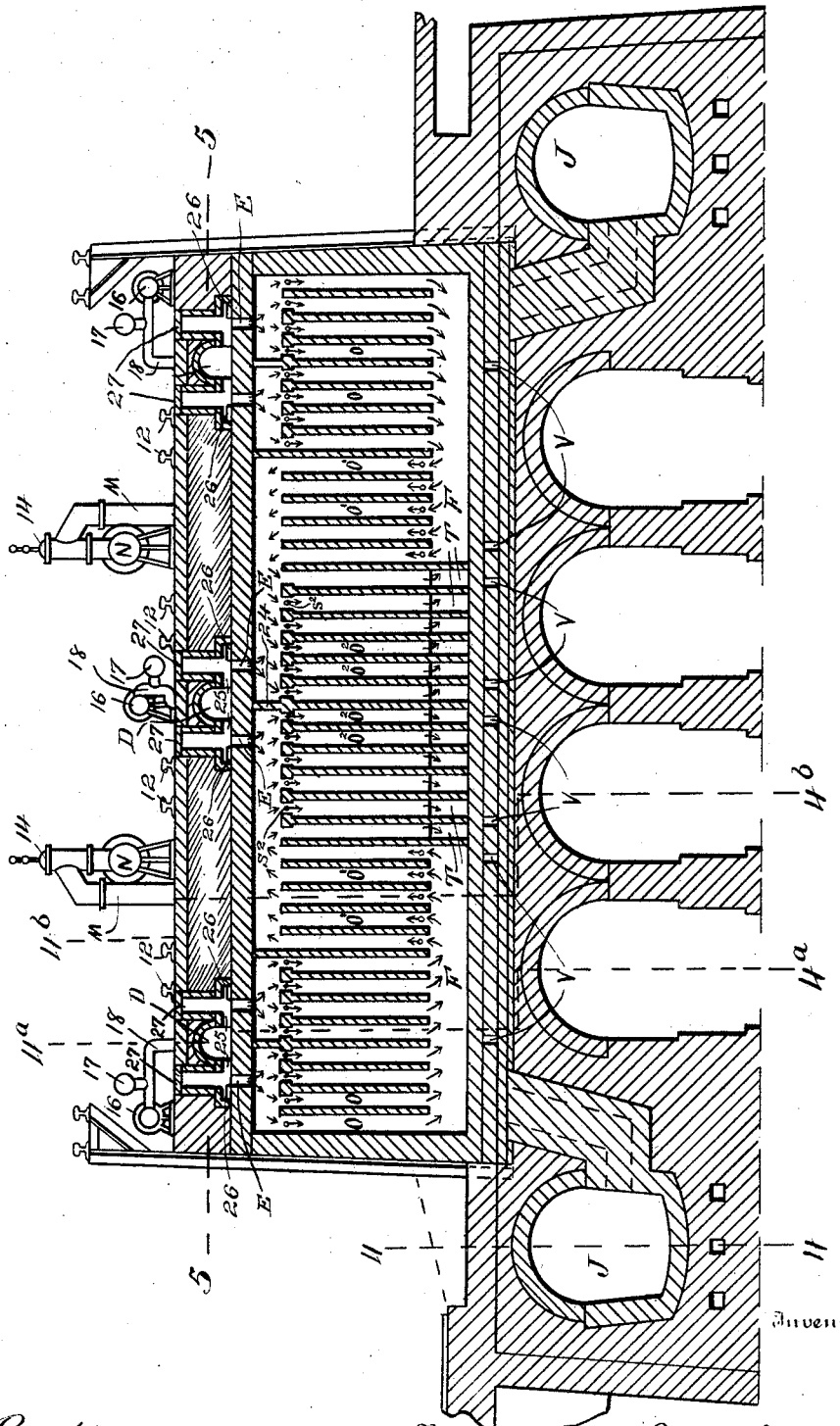

No. 770,151. PATENTED SEPT. 13, 1904.
T. BAUER.
COKE OVEN.
APPLICATION FILED JAN. 3, 1900.
NO MODEL. 4 SHEETS—SHEET 3.
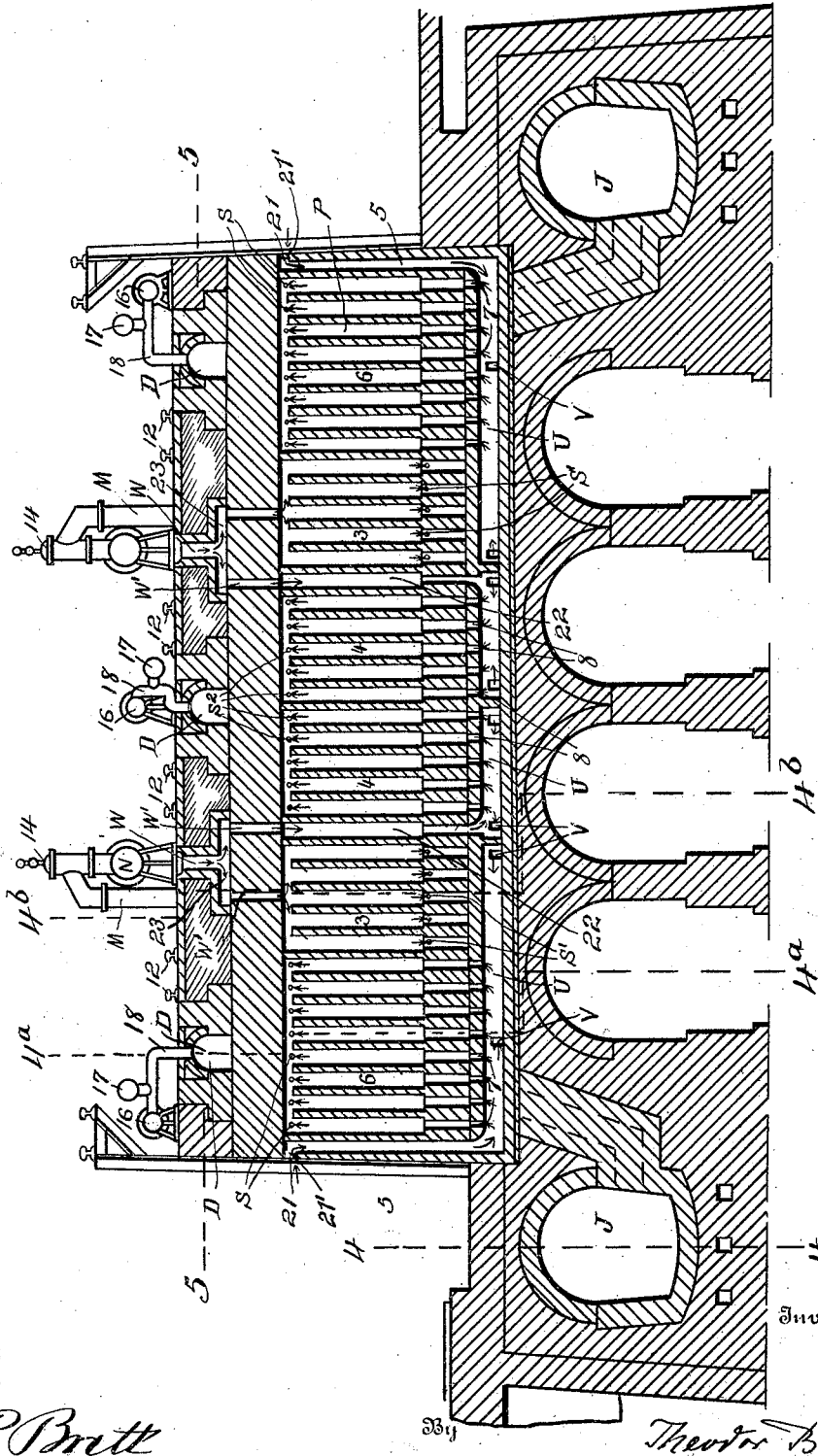

No. 770,151. PATENTED SEPT. 13, 1904.
T. BAUER.
COKE OVEN.
APPLICATION FILED JAN. 3, 1900.
NO MODEL. 4 SHEETS—SHEET 4.
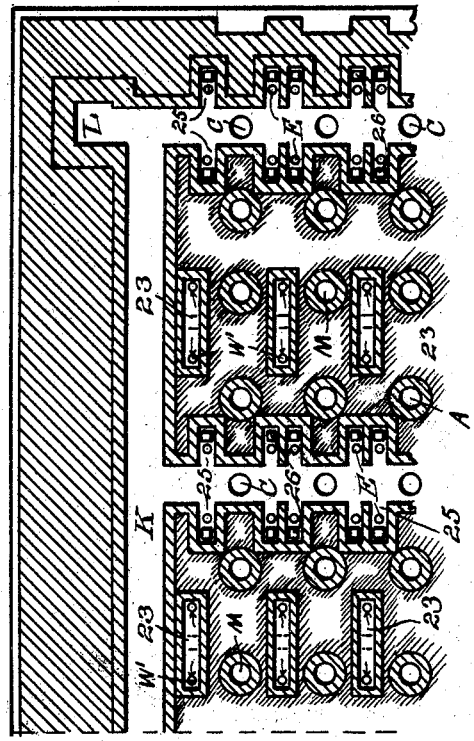
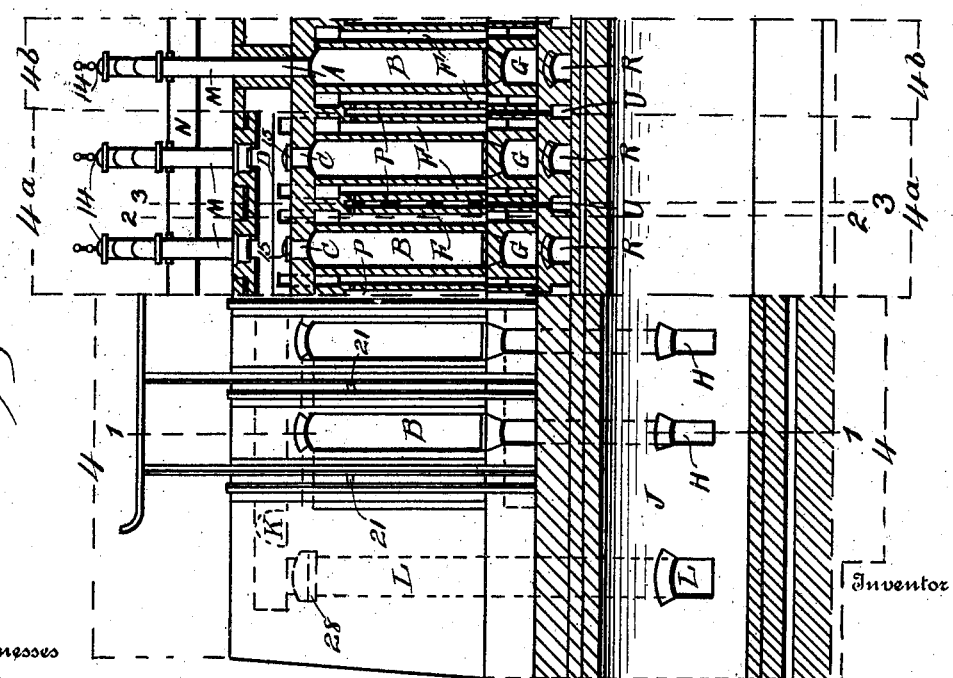

No. 770,151.　　　　　　　　　　　　　　　　　　　Patented September 13, 1904.

UNITED STATES PATENT OFFICE.

THEODOR BAUER, OF BERLIN, GERMANY.

COKE-OVEN.

SPECIFICATION forming part of Letters Patent No. 770,151, dated September 13, 1904.

Application filed January 3, 1900. Serial No. 263. (No model.)

*To all whom it may concern:*

Be it known that I, THEODOR BAUER, a citizen of the Empire of Germany, residing at Berlin, in the Empire of Germany, have invented a new and useful Coke-Oven, of which the following is a specification.

My invention relates to improvements in batteries of adjacent coke-ovens whereby the gases developed are more completely utilized; and the objects of my improvement are, first, to provide several, preferably three, main mixing-channels in the brickwork above the ovens in the longitudinal direction of the battery and adapted for collecting the gases from the ovens; second, to provide on each longitudinal side of each oven one vertical heating-chamber consisting of a plurality of groups of vertical flues in which the combustible mixture admitted from the main mixing-channels is conducted in serpentine lines and repeatedly mixed with hot air; third, to provide between the two adjacent heating-chambers between any two ovens and on the side of each external vertical heating-chamber of the end ovens one vertical air-heating chamber consisting of a plurality of groups of vertical channels which receive the cold air from without and conduct the heated air to the heating-chambers; fourth, to provide means for exhausting from time to time the gases developed in the ovens and conducting them to a condensing apparatus, where they are purified; fifth, to provide tubes for returning a part of the purified gases from the condensing apparatus to the main mixing-channels by means of branches; sixth, to provide steam-tubes for injecting steam into the branches of the return gas-tubes, and thereby introducing the purified gases into the main mixing-channels, so that by the mixture of the gases from the ovens with the purified gases and the steam a uniform source of heat for heating the walls of the ovens is obtained; seventh, to provide along the longitudinal sides of the battery in the brickwork two main collecting-flues for receiving the burned gases from the heating-chambers and conducting them to places where their heat is to be utilized and to a chimney, and, eighth, to provide channels connecting the main mixing-channels with each other and with the two main collecting-flues for allowing any excess of the battery-gases or the mixture to escape. I attain these objects by the coke-oven illustrated in a mode of execution in the accompanying drawings, in which—

Figure 1 is a vertical longitudinal section through an oven on the line 1 1 in Fig. 4. Fig. 2 is a vertical longitudinal section through a heating-chamber on the line 2 2 in Fig. 4. Fig. 3 is a vertical longitudinal section through an air-heating chamber on the line 3 3 in Fig. 4. Fig. 4 is on the left part an elevation of a corner of the battery and a vertical section through one main collecting-flue on the line 4 4 in Figs. 1 to 3, in the middle part a longitudinal section through part of the battery on the broken line $4^a\ 4^a$ in Figs. 1 to 3, and on the right part a longitudinal section through part of the battery on the broken line $4^b\ 4^b$ in Figs. 1 to 3; and Fig. 5 is a horizontal section through a part of the battery on the line 5 5 in Figs. 1 to 3.

Similar characters of reference refer to similar parts throughout the several views.

The battery consists of a convenient number of adjacent coke-ovens B B, double this number of heating-chambers F F adjacent to the sides of the coke-ovens B, and a number of air-heating chambers P P—to wit, one between every two adjacent heating-chambers F F and one on each end of the battery alongside of the external heating-chambers F F of the ovens B B at the end of the battery. Each oven B can be charged with coal from four lorries 11 11 on the tracks 12 12 through four top holes A A, which can be closed with suitable covers 13 13. Above the top surface of the battery, in the longitudinal direction of the latter, two exhausting-mains N N are placed, which are connected with each oven B by branches M M and stop-valves 14 14 and lead to a condensing apparatus of any known construction. (Not shown.)

In the brickwork above the ovens B B three main mixing-channels D D, Fig. 1, are disposed in the longitudinal direction of the battery. The ends of these main mixing-channels D D and also several intermediate points of them at distances comprising ten to fifteen ovens B B are connected by channels K K, (see Figs. 4 and 5,) whereby they are put into communication with each other. The main mixing-channels D D are connected with every oven B by openings C C, Fig. 4, which can be closed by suitable slides or blocks 15 15.

On the top surface of the battery in its longitudinal direction three tubes 16 16, Fig. 3, for the purified gases returning from the condensing apparatus and three steam-tubes 17 17, leading either from this apparatus or from any other steam source, are disposed. These gas-tubes 16 16 and steam-tubes 17 17 are so connected with the main mixing-channels D D by common tubes 18 18 that the steam can inject purified gas from the tube 16 into the main mixing-channel D, preferably at places between the ovens B B or the top openings C C. To this end steam-jets are introduced into the tubes 18 18 in the manner well known for Giffard's injectors.

In the bottom brickwork two main collecting-flues J J, Fig. 2, are provided along the longitudinal battery sides.

Beneath each oven B are provided in the brickwork two channels, one above the other, of which the upper channel G, Fig. 4, serves for heating the bottom of the oven and the lower channel R for partly cooling the upper channel G. (See Fig. 1.) Each upper channel G is divided in the middle by a partition-wall 19 into halves, which are connected with the main collecting-flues J J by descending channels H H. The latter can be opened and closed by slides 20 20 in a well-known manner. Each lower channel R is divided by three partitions R', Fig. 1, into four parts.

Beneath each heating-chamber P, Fig. 3, a bottom air-supply channel U is provided in the brickwork, which is divided by three partitions into four parts. The two external parts of the channel U communicate with the atmosphere by vertical channels 5 5 and lateral openings 21 21 and with the two external parts of the lower channel R, Fig. 1, by two openings V V. The two internal parts of the channel U communicate with the atmosphere by vertical channels 22 22 W' W', Fig. 3, and top openings W W and with the two internal parts of the lower channel R by two openings V V. The lateral openings 21 21 may be provided with slides (not shown) to regulate the admission of the air. The vertical channels 5 5 are intended for keeping the external surfaces of the battery sides comparatively cool.

As is shown at Fig. 3, the air-heating chamber P is divided by a number of vertical partitions into six groups of vertical channels 6 3 4 4 3 6. Of these the two external groups 6 6 communicate with the two external parts of the bottom air-supply channel U by means of narrow holes 7 7.

It will be evident that the cold air entering the lateral openings 21 21 and the vertical channels 5 5 is gradually heated by the adjacent heating-chambers F F, Fig. 4, in its course through the external parts of the channels U and R, the holes 7 7, and the vertical channels 6 6 until it is hot on entering the heating-chambers F F through the upper holes S S, Fig. 3. As will be seen from Fig. 3, the cold air entering each top opening W is bifurcated in the channel 23. The air flowing through the external channels W' W' is heated on its passage down through the vertical channels 3 3 and enters in its hot state the heating-chambers F F through the lower holes S' S'. The air entering the internal channels W' W' is equally heated in its course through the vertical channels 22, Fig. 3, the internal parts of the channels U and R, the narrow lower holes 8 8, and the vertical channels 4 4 until it is hot on entering the heating-chambers F F through the upper holes $S^2 S^2$. The arrangement of the air-heating chambers described so far is so made that more air is supplied to the middle of the oven, and thereby keeps it somewhat cooler than the ends of the oven.

Each heating-chamber F, Fig. 2, is divided in the middle by a partition-wall 24 into halves and communicates with the three main mixing-channels D D by six vertical channels E E. The latter are connected with the main channels D D by branches 25 25 and can be opened and closed by slides 26 26. For regulating these slides 26 26 the channels E E are lengthened upward and provided with convenient covers 27 27. The two halves of the heating-chamber F are each divided by a number of partitions into three groups of vertical flues O O' $O^2$, of which the last flues $O^2 O^2$ communicate with the upper bottom channel G by means of slots T T. (See also Fig. 1.)

The cross-channels K K, connecting the three main mixing-channels D D, are also connected with the two main collecting-flues J J by means of descending channels L L (see Figs. 4 and 5) to lead off any excess of gases or mixture accumulating in the main mixing-channels D D. Thereby every danger of explosion is avoided. The channels L L can be more or less closed by registers 28, Fig. 4, whereby the quantity of the gases admitted direct to the main collecting-flues J J can be regulated.

The coke-oven described so far is operated as follows: The several ovens B B are charged with coals, as usual. Normally the stop-valves 14 14, Fig. 1, of the exhausting branches M M are closed and the slides 15 15 are removed to open the top openings C C, so that the gases developed from the coals in the ovens B B are allowed to escape into the main mixing-channels D D. From time to time the openings C C are closed and the stop-valves 14 14 are opened, when the gases will be exhausted from the ovens B B through the branches M M and the tubes N N and conducted to the condensing apparatus, where they are in any known manner purified. After a sufficient quantity of the gases has thus been extracted from the ovens B B the stop-valves 14 14 are again closed and the main mixing-channels D D are opened to the ovens. By means of the respective devices steam is admitted through the tubes 17 17 18 18 to inject purified gases from the condensing apparatus through the tubes 16 16 into the main mixing-channels D D. Thus a mixture of gases direct from the ovens B B with purified gases from the condensing apparatus and the steam is obtained, which is then admitted from the main mixing-channels D D through the top channels E E, Fig. 2, into the several heating-chambers F F. The mixture admitted from either external main mixing-channel D into the heating-chamber is first mixed with hot air coming from the air-heating chamber P through the top holes S S, Fig. 3, so that the combustion can take place during the downward passage of the mixture through the eight vertical flues O O, Fig. 2, in the direction of the arrows. On arriving at the lower ends of the following five flues O' O' a further quantity of hot air is added to the mixture through the lower holes S' S', so that the combustion can continue during the upward passage of the mixture through the flues O' O'. On arriving above the upper ends of the last flues $O^2 O^2$ a quantity of fresh mixture from the middle main mixing-channel D will be added to the burned gases in unison with hot air coming from the air-heating chamber P through the upper holes $S^2 S^2$. Then a fresh combustion can take place during the downward passage of the mixture through the flues $O^2 O^2$, Fig. 2. The burned gases pass through the slots T T, Fig. 1, the upper bottom channel G, and the descending channel H to the main collecting-flue J, while not only heating the bottom of the oven, but also preliminarily heating the cold air circulating in the channels R and U. The upper ends of the flues O O and $O^2 O^2$ are preferably made narrower in order to better mix the mixture with the hot air, and thus to facilitate the combustion. The slides 26 26, Fig. 2, can be adjusted to regulate the admission of the mixture from the three main mixing-channels D D to the heating-chamber.

On comparing Fig. 3 with Fig. 2 it will be seen that the air to be heated in the air-heating chamber P always takes a direction opposite to that of the burning mixture in the adjacent heating-chambers, whereby the heating of the air is accelerated.

As already mentioned, the main mixing-channels D D collect the gases from all the ovens of the battery and mix them, so that an average uniform quality of the gases is insured. The mixture of these battery-gases with a part of the purified gases furnished by the condensing apparatus and the steam injected forms a source of heat which can easily be kept uniform, so that the combustion of the mixture in the heating-chambers will remain constant and undisturbed, and in consequence of this the outturn of the battery will be regular. The steam injected will at the same time keep the temperature in the main mixing-channels D D so low that any tendency to draw air into these channels is avoided. Moreover, the mechanical power of the steam will insure a supply of air before the purified gases enter the channels and prevent any return of the flames, and thereby avoid all dangers of explosion. As only a part of the purified gases produced by the condensing apparatus need be mixed with the battery-gases in the main mixing-channels D D, large quantities of purified gases are obtained and saved for other purposes. In addition to this the useful by-products of the condensing process are gained. A large quantity of unburned gases will be allowed to escape through the more or less opened registers 28 and the descending channels L L into the main collecting-flues J J. Thereby these gases are saved and reserved for other purposes, they being conducted with the burned products from the heating-chambers to the places of consumption—for example, to furnaces of steam-boilers and the like. The purified gases furnished by the condensing apparatus may also be entirely saved for other purposes by the employment of generator-gases, which are produced in generators of any known construction from coals poor in gas but yielding much coke and are conducted through the tubes 16 16 to the main mixing-channels D D with the assistance of the steam. This is an advantage, as the generator-gases can be produced from the coke residues very cheaply.

What I claim as my invention, and desire to secure by Letters Patent, is—

1. In a battery of adjacent coke-ovens, the combination with a plurality of ovens, of a plurality of heating-chambers, two on both sides of each oven, each divided by partitions into a plurality of groups of vertical flues, a plurality of air-heating chambers, one between two adjacent heating-chambers and one on the side of the external heating-chambers of the end ovens, each divided by partitions into a plurality of groups of vertical channels which communicate with the atmosphere by openings and with the flues of the adjacent heating-chambers by holes, three main mixing-channels placed in the longitudinal direction of the battery above the ovens and the heating-chambers and communicating therewith, means for closing and opening the three main mixing-channels to the ovens and the heating-chambers, means for arbitrarily exhausting the gases from the ovens, a condensing apparatus for purifying the exhausted gases, three tubes with branches for conducting a part of the purified gases from the condensing apparatus to the three main mixing-channels, a steam source, means for injecting the purified gases from the branches of the three tubes by means of steam from the steam source into the three main mixing-channels, a plurality of horizontal heating-flues, one beneath each oven and divided by one partition into halves which communicate with the last flues of the adjacent vertical heating-chambers by slots, a plurality of horizontal cooling-channels, one beneath each horizontal heating-flue and divided by partitions into several parts which communicate by holes with one adjacent air-heating chamber for preliminarily heating the air, two main collecting-flues placed along the two longitudinal battery sides and leading to boilers or the like and to a chimney, a plurality of descending flues connecting the horizontal heating-flues with the main collecting-flues, a plurality of communicating channels connecting the three main mixing-channels with each other, a plurality of descending channels connecting the communicating channels with the two main collecting-flues, and means for regulating the escape of any excess of gases or mixture from the main mixing-channels to the main collecting-flues.

2. In a battery of adjacent coke-ovens, the combination with a plurality of vertical narrow ovens, of a plurality of vertical heating-chambers, two on both sides of each vertical narrow oven, each divided by partitions into a plurality of groups of vertical flues, a plurality of vertical air-heating chambers, one between two adjacent heating-chambers and one on the side of the external heating-chambers of the end ovens, each divided by partitions into a plurality of groups of vertical channels which communicate with the atmosphere by means of adjustable openings and with the flues of the adjacent vertical heating-chambers by holes located alternately at the top and at the bottom for the several groups, three main mixing-channels placed in the longitudinal direction of the battery above the vertical narrow ovens and the vertical heating-chambers and communicating therewith, means for closing and opening the three main mixing-channels to the vertical narrow ovens and the vertical heating-chambers, means for arbitrarily exhausting the gases from the vertical narrow ovens, a condensing apparatus for purifying the exhausted gases, three tubes with branches for conducting a part of the purified gases from the condensing apparatus to the three main mixing-channels, a steam source, means for injecting the purified gases from the branches of the three tubes by means of steam from the steam source into the three main mixing-channels, a plurality of horizontal heating-flues, one beneath each vertical narrow oven and divided by one partition into halves which communicate with the last flues of the adjacent vertical heating-chambers by slots, a plurality of horizontal cooling-channels, one beneath each horizontal heating-flue and divided by partitions into several parts which communicate by holes with one adjacent vertical air-heating chamber for preliminarily heating the air, two main collecting-flues placed along the two longitudinal battery sides and leading to boilers or the like and to a chimney, a plurality of descending flues connecting the horizontal heating-flues with the main collecting-flues, means for opening and closing the descending flues, a plurality of communicating channels connecting the three main mixing-channels with each other, a plurality of descending channels connecting the communicating channels with the two main collecting-flues, and means for regulating the escape of any excess of gases or mixture from the three main mixing-channels to the two main collecting-flues.

In testimony that I claim the foregoing as my invention I have signed my name in presence of two subscribing witnesses.

THEODOR BAUER.

Witnesses:
  HENRY HASPER,
  WOLDEMAR HAUPT.